United States Patent Office 3,483,130
Patented Dec. 9, 1969

3,483,130
WATERLESS ELECTROLYTE FOR ELECTROLYTIC CAPACITORS
Bengt Åke Lagercrantz, Stocksund, and Bengt Anders Nordin, Roslags-Nasby, Sweden, assignors to Telefonaktiebolaget L M Ericsson, Stockholm, Sweden, a corporation of Sweden
No Drawing. Filed June 7, 1967, Ser. No. 644,058
Claims priority, application Sweden, July 12, 1966, 9,510/66
Int. Cl. H01g 9/02; C09k 3/00
U.S. Cl. 252—62.2      1 Claim

ABSTRACT OF THE DISCLOSURE

An anhydrous electrolyte for use in electrolytic capacitors is disclosed. Said electrolyte consists of cyclohexylamine picrate dissolved in ethylene glycol monomethyl ether.

---

The present invention refers to an electrolyte free from water for electrolytic capacitors with aluminum electrode.

It is known since long time ago to use picric acid in electrolytes for capacitors in order to improve their stability and in later years a waterless solvent has been used for the picric acid. Examples of this are given in the U.S. Patent 2,759,132.

The electrolytes given in this patent, however, do not have a sufficiently low specific resistance, so that they can be used in low voltage capacitors. The electrolyte that is the best one in this respect, has a specific resistance of 570 ohm-cm., 125° C. which corresponds to several thousands ohm-cm. at 25° C. Such an electrolyte is, with the surface enlargement nowadays achieved by etching of aluminum foils, not adequate for low voltage capacitors, i.e. capacitors with a marked voltage below 100 v. For the lowest marked voltages—2.5 v. to 3.5 v.—one has to have a specific resistance of at the most 500 ohm-cm. at 25° C.

In tests made with different electrolytes, in which the picric acid is contained as anion and different amines as cation, we have arrived at an electrolyte in which the picrate is cyclohexylamine picrate and the solvent ethylene glycol monomethyl ether. This electrolyte gives to the finished capacitor very stable values during a long time of working at low as well as at high temperatures. The capacitor has very good low temperature properties and is stable within a relatively great frequency range. As an example of the composition of the electrolyte the following may be given:

| | |
|---|---|
| Picric acid _____ g__ | 300 |
| Cyclohexylamine _____ g__ | 130 |
| Ethylene glycol monomethyl ether _____ l__ | 1 |

This electrolyte has a specific resistance of 270 ohm-cm. at 25° C. and 50 ohm-cm. at 125° C.

A duration test carried out with a capacitor for 8 v. at 100° C. at a working voltage of 8 v. gave the values indicated in the following table. The leak current I has been measured at 100° C. while the capacitance C as well as the loss factor tgó and the impedance Z have been measured after cooling down to 25° C.

| | $C_{\mu F}$ | tgó, Percent | Z 100 kHz.Ω | I 100° C. μA |
|---|---|---|---|---|
| 0 h_____ | 190 | 8.6 | 0.4 | 1.3 |
| 100 h_____ | 192 | 8.7 | 0.5 | 2.9 |
| 500 h_____ | 190 | 8.4 | 0.4 | 0.8 |
| 1000 h_____ | 181 | 8.3 | 0.5 | 0.2 |
| 5000 h_____ | 180 | 11.0 | 0.5 | 0.2 |

We claim:
1. Waterless electrolyte for electrolytic capacitors with aluminum electrode consisting essentially of cyclohexylamine picrate dissolved in ethylene glycol monomethyl ether.

References Cited
UNITED STATES PATENTS
3,303,143    2/1967    Shepherd et al. _____ 252—62.2

TOBIAS E. LEVOW, Primary Examiner
J. COOPER, Assistant Examiner

U.S. Cl. X.R.
317—230